(12) United States Patent
Uchida (10) Patent No.: US 9,728,218 B2
(45) Date of Patent: Aug. 8, 2017

(54) MAGNETIC RECORDING MEDIUM FOR HEAT-ASSISTED MAGNETIC RECORDING

(71) Applicant: FUJI ELECTRIC CO., LTD., Kawasaki-shi (JP)

(72) Inventor: Shinji Uchida, Matsumoto (JP)

(73) Assignee: FUJI ELECTRIC CO., LTD., Kawasaki-Shi (JP)

(*) Notice: Subject to any disclaimer, the term of this patent is extended or adjusted under 35 U.S.C. 154(b) by 0 days.

(21) Appl. No.: 14/484,829

(22) Filed: Sep. 12, 2014

(65) Prior Publication Data

US 2014/0377590 A1    Dec. 25, 2014

Related U.S. Application Data

(63) Continuation of application No. PCT/JP2012/004491, filed on Jul. 11, 2012.

(30) Foreign Application Priority Data

Mar. 22, 2012 (JP) .................................. 2012-065458

(51) Int. Cl.
 *G11B 5/73* (2006.01)
 *G11B 5/65* (2006.01)
 (Continued)

(52) U.S. Cl.
 CPC .............. *G11B 5/7325* (2013.01); *G11B 5/65* (2013.01); *G11B 5/66* (2013.01); *G11B 5/708* (2013.01);
 (Continued)

(58) Field of Classification Search
 None
 See application file for complete search history.

(56) References Cited

U.S. PATENT DOCUMENTS 5,652,054 A    7/1997    Kikitsu et al.
6,068,739 A    5/2000    Suzuki et al.
(Continued)

FOREIGN PATENT DOCUMENTS

JP    H08-83418 A    3/1996
JP    3010156 B2    2/2000
(Continued)

OTHER PUBLICATIONS

Masukazu Igarashi et al., "Computer Simulation for Thermal Assist Recording," Technical Report of IEICE, MR2004-39 (Dec. 2004), p. 1-6.

*Primary Examiner* — Kevin Bernatz
(74) *Attorney, Agent, or Firm* — Rabin & Berdo, P.C.

(57) ABSTRACT

A magnetic recording medium for heat-assisted magnetic recording is provided. A magnetic recording layer includes upper and lower magnetic recording layers. The lower magnetic recording layer has a lower granular structure including lower magnetic crystal grains, and a lower non-magnetic portion, that surrounds the lower magnetic crystal grains, mainly composed of carbon. The upper magnetic recording layer has an upper granular structure including upper magnetic crystal grains, and an upper non-magnetic portion, that surrounds the upper magnetic crystal grains, formed from a material selected from the group consisting of silicon nitride, titanium oxide and titanium nitride.

20 Claims, 2 Drawing Sheets

(51) Int. Cl.
*G11B 5/66* (2006.01)
*G11B 5/74* (2006.01)
*G11B 5/708* (2006.01)
*G11B 5/00* (2006.01)

(52) U.S. Cl.
CPC ...... *G11B 5/743* (2013.01); *G11B 2005/0021* (2013.01)

(56) References Cited

U.S. PATENT DOCUMENTS

| | | | |
|---|---|---|---|
| 6,641,934 | B1 | 11/2003 | Suzuki et al. |
| 8,268,462 | B2* | 9/2012 | Peng ............... B82Y 10/00 428/836.2 |
| 8,530,065 | B1* | 9/2013 | Chernyshov ........... G11B 5/65 428/829 |
| 2001/0036564 | A1 | 11/2001 | Ohmori |
| 2003/0150595 | A1* | 8/2003 | Chen ............... F28F 21/084 165/80.3 |
| 2003/0215675 | A1 | 11/2003 | Inaba et al. |
| 2004/0161638 | A1 | 8/2004 | Maeda et al. |
| 2005/0068855 | A1* | 3/2005 | Morikawa ........... G11B 5/66 369/13.38 |
| 2009/0040644 | A1* | 2/2009 | Lu ..................... G11B 5/314 360/59 |
| 2010/0110576 | A1 | 5/2010 | Akagi et al. |
| 2012/0052330 | A1 | 3/2012 | Takekuma et al. |
| 2012/0225325 | A1* | 9/2012 | Nemoto ............... G11B 5/65 428/829 |
| 2012/0251845 | A1* | 10/2012 | Wang ................. G11B 5/66 428/827 |
| 2012/0300600 | A1 | 11/2012 | Kanbe et al. |
| 2016/0293195 | A1* | 10/2016 | Liu .................... C23C 14/34 |

FOREIGN PATENT DOCUMENTS

| | | |
|---|---|---|
| JP | 2001-101645 A | 4/2001 |
| JP | 2001-291230 A | 10/2001 |
| JP | 3318204 B2 | 8/2002 |
| JP | 2004-178753 A | 6/2004 |
| JP | 2010-503139 A | 1/2010 |
| JP | 2010-108571 A | 5/2010 |
| JP | 2010-129115 A | 6/2010 |
| JP | 2011-119006 A | 6/2011 |
| JP | 2011-154746 A | 8/2011 |
| JP | 2011-258256 A | 12/2011 |
| JP | 2012-048784 A | 3/2012 |
| WO | WO-02/39433 A1 | 5/2002 |

\* cited by examiner

MAGNETIC RECORDING MEDIUM FOR HEAT-ASSISTED MAGNETIC RECORDING

CROSS-REFERENCE TO RELATED APPLICATIONS

This is a continuation application of International Application number PCT/JP2012/004491, which was filed on Jul. 11, 2012 and designated the United States. Furthermore, this application claims the benefit of foreign priority of Japanese application number 2012-065458, filed on Mar. 22, 2012. The disclosures of both of these earlier applications are incorporated herein by reference.

TECHNICAL FIELD

The present invention relates to a magnetic recording medium used for heat-assisted magnetic recording.

BACKGROUND ART

A perpendicular magnetic recording scheme has been employed as a technique of achieving higher magnetic recording density. A perpendicular magnetic recording medium includes at least a non-magnetic substrate and a magnetic recording layer formed from a hard magnetic material. The perpendicular magnetic recording medium may optionally further include an underlayer that is formed from a soft magnetic material and performs a role of concentrating a magnetic flux generated by a magnetic head on the magnetic recording layer, an underlayer for orienting the hard magnetic material of the magnetic recording layer in a desired direction, a protective film for protecting the surface of the magnetic recording layer, and the like.

Japanese Patent Application Publication No. 2001-291230, Japanese Patent Application Publication No. H08-083418, and WO 2002/039433 disclose granular magnetic materials as a material for forming the magnetic recording layer of the perpendicular magnetic recording medium (see Patent Documents 1 to 3 and the like). The granular magnetic material includes magnetic crystal grains and a non-magnetic material segregated so as to surround the magnetic crystal grains. The individual magnetic crystal grains in the granular magnetic material are magnetically separated by the non-magnetic material.

In recent years, in order to further improve recording density of a perpendicular magnetic recording medium, there is a need to reduce the size of the magnetic crystal grains in the granular magnetic material. On the other hand, a reduction in the size of the magnetic crystal grains results in deterioration in the thermal stability of recorded magnetizations (signals). Thus, in order to compensate for the deterioration in the thermal stability caused by the reduction in the size of the magnetic crystal grains, it is requested to form the magnetic crystal grains in the granular magnetic material using a material having higher crystalline magnetic anisotropy.

Moreover, in a magnetic recording layer formed from a granular magnetic material, there is a problem that a plurality of magnetic crystal grains forms (clusters) one magnetization reversal unit. This problem is considered to result from an exchange interaction between magnetic crystal grains. In order to solve this problem, Japanese Patent Application Publication No. 2011-119006 discloses a magnetic recording layer in which a first layer that contains Ru, Cr, Ti, Ir, or oxides of these metals as a non-magnetic material and has negative exchange interaction and a second layer that contains $SiO_2$ as a non-magnetic material and has positive exchange interaction are stacked, whereby exchange interaction is suppressed (see Patent Document 4).

A $L1_0$-based ordered alloy is proposed as a material having the required high crystalline magnetic anisotropy. Japanese Patent No. 3318204, Japanese Patent No. 3010156, Japanese Patent Application Publication No. 2001-101645, Japanese Patent Application Publication No. 2004-178753, and Japanese Translation of PCT Application No. 2010-503139 disclose an alloy such as FePt, CoPt, FePd, or CoPd that includes at least one element selected from the group consisting of Fe, Co, and Ni, and at least one element selected from the group consisting of Pt, Pd, Au, and Ir as a $L1_0$-based ordered alloy (see Patent Documents 5 to 9). Further, these documents disclose various methods for manufacturing a thin film of $L1_0$-based ordered alloys (see Patent Documents 5 to 9).

On the other hand, since the thickness of a magnetic recording layer is basically uniform in an in-plane direction of a medium (the in-plane direction may be a direction which is in a lateral direction of the medium or perpendicular to a thickness direction of the medium), a reduction in the magnetization reversal unit (magnetic crystal grain) means a decrease in the cross-sectional area of the magnetization reversal unit (magnetic crystal grain) having a constant height. As a result, since a demagnetizing field acting on the magnetization reversal unit (magnetic crystal grain) decreases, and a required magnetic field (reversing magnetic field) for reversing the magnetization of the magnetization reversal unit (magnetic crystal grain) increases. Considering the shape of the magnetization reversal unit (magnetic crystal grain), it means that an improvement in the recording density requires a higher magnetic field during recording (writing) of signals (magnetizations).

In order to increase the recording magnetic field (writing performance), a heat-assisted magnetic recording scheme which uses a head having the function of heating a magnetic recording layer is proposed. This scheme utilizes temperature dependency on a magnetic anisotropy constant (Ku), of a magnetic material (that is, such a characteristic that the higher the temperature, the smaller the magnetic anisotropy constant Ku). That is, the temperature of the magnetic recording layer is increased to temporarily decrease the magnetic anisotropy constant Ku to reduce a reversing magnetic field, and writing is performed during this period. Since the magnetic anisotropy constant Ku returns to its original high value after the temperature decreases, it is possible to stably hold recording signals (magnetizations). When the heat-assisted magnetic recording scheme is applied, it is necessary to design the magnetic recording layer taking the conventional design guidelines and the temperature characteristics into consideration.

According to a study by Igarashi et al. "Computer Simulation for Thermal Assist Recording—The Recording Format" (Technical Report of The Institute of Electronics, Information, and Communication Engineers (IEICE), 2004, MR2004-39), the transition width between recording bits in the heat-assisted magnetic recording scheme is determined by a head magnetic field gradient and a temperature gradient (see Non-Patent Document 1).

Patent Document 1: Japanese Patent Application Publication No. 2001-291230
Patent Document 2: Japanese Patent Application Publication No. H08-083418
Patent Document 3: WO 2002/039433
Patent Document 4: Japanese Patent Application Publication No. 2011-119006

Patent Document 5: Japanese Patent No. 3318204
Patent Document 6: Japanese Patent No. 3010156
Patent Document 7: Japanese Patent Application Publication No. 2001-101645
Patent Document 8: Japanese Patent Application Publication No. 2004-178753
Patent Document 9: Japanese Translation of PCT Application No. 2010-503139
Non-Patent Document 1: Igarashi et al. "Computer Simulation for Thermal Assist Recording—The Recording Format" (Technical Report of The Institute of Electronics, Information, and Communication Engineers (IEICE), 2004, MR2004-39

DISCLOSURE OF INVENTION

In the heat-assisted magnetic recording, in order to determine the range of recording bits accurately and reduce transition noise between recording bits, a temperature gradient dT/dx in the in-plane direction of the magnetic recording layer is important. In design of heat-assisted magnetic recording media, it is necessary to realize the temperature gradient dT/dx of 10 K/nm or higher. Here, "x" represents the position on a principal surface of a magnetic recording medium, and "T" represents an average temperature of a magnetic recording layer at the position x.

The present inventor has conducted thermal analysis according to a finite element method and has found that it is effective to suppress heat transfer in the in-plane direction of a magnetic recording layer to increase a difference in heat transfer in the in-plane direction and the depth direction (heat transfer anisotropy) in order to increase the temperature gradient dT/dx. Further, the present inventor has also found that, when a non-magnetic portion surrounding magnetic crystal grains (magnetic grains) was formed using a material having a low thermal conductivity, it was possible to suppress heat transfer in the in-plane direction of the magnetic recording layer, and the heat transfer anisotropy was increased and the temperature gradient dT/dx was increased.

However, it was understood that, when a magnetic recording medium was manufactured using silicon oxide or titanium oxide which is a material having a low thermal conductivity as the non-magnetic portion, it was difficult to completely surround the magnetic crystal grains (magnetic grains) and it was not possible to maintain magnetic separation. On the other hand, it was understood that it was necessary to form a non-magnetic portion (non-magnetic grain boundary) containing carbon as its main component in order to completely surround the magnetic crystal grains (magnetic grains) to maintain magnetic separation. However, thermal analysis showed that, since the thermal conductivity of the non-magnetic portion (non-magnetic grain boundary) containing carbon as its main component is too large, it was not possible to obtain the temperature gradient dT/dx of 10 K/nm or higher. That is, it was necessary to realize the temperature gradient dT/dx of 10 K/nm or higher while maintaining magnetic separation between magnetic crystal grains.

The present invention has been made in view of the above-described problems and an object thereof is to provide a magnetic recording medium having a magnetic recording layer having a granular structure which can be advantageously used for heat-assisted magnetic recording.

The present inventor has studied various material structures satisfying the above-described conditions as means for solving the conventional problems. As a result, it was found that the above-described conditions can be satisfied using a stacked granular structure formed by stacking a layer having a granular structure that accelerates magnetic separation and a layer having a granular structure that increases thermal resistance in the in-plane direction. Specifically, when a magnetic recording layer was formed by stacking a layer having a granular structure in which a non-magnetic portion surrounding magnetic crystal grains (magnetic grains) is formed from a material mainly composed of carbon and a layer having a granular structure in which a non-magnetic portion surrounding magnetic crystal grains (magnetic grains) is formed from a material mainly composed of oxides or nitrides of silicon or titanium in that order, it was possible to realize the temperature gradient dT/dx of 10 K/nm or higher in the in-plane direction of the magnetic recording layer while maintaining magnetic separation between the magnetic crystal grains.

A magnetic recording medium for heat-assisted magnetic recording according to the present invention based on the above-described findings includes at least: a non-magnetic substrate; and a magnetic recording layer, wherein the magnetic recording layer includes a lower magnetic recording layer and an upper magnetic recording layer, the lower magnetic recording layer has a granular structure including magnetic crystal grains and a non-magnetic portion that surrounds the magnetic crystal grains and is formed from a material mainly composed of carbon, and the upper magnetic recording layer has a granular structure including magnetic crystal grains and a non-magnetic portion that surrounds the magnetic crystal grains and is formed from a material different from that of the non-magnetic portion of the lower magnetic recording layer. Here, the non-magnetic portion of the upper magnetic recording layer may be formed from a material selected from the group consisting of silicon oxide, silicon nitride, titanium oxide, and titanium nitride. Moreover, the magnetic crystal grains of the lower magnetic recording layer and the magnetic crystal grains of the upper magnetic recording layer may each be formed from an ordered alloy. Preferably, the magnetic crystal grains may be formed from an alloy containing at least one element selected from the group consisting of Fe, Co, and Ni, and at least one element selected from the group consisting of Pt, Pd, Au, and Ir. More preferably, the magnetic crystal grains may be formed from a material selected from the group consisting of FePt, CoPt, FePd, and CoPd.

Moreover, the magnetic recording medium for heat-assisted magnetic recording according to the present invention may further include, between the non-magnetic substrate and the magnetic recording layer, one or a plurality of layers selected from the group consisting of a heat sink layer and a seed layer. Further, the magnetic recording medium for heat-assisted magnetic recording according to the present invention may further include a protective layer provided on the magnetic recording layer.

In the magnetic recording medium for heat-assisted magnetic recording according to the present invention employing the configuration described above, it is possible to realize the temperature gradient dT/dx of 10 K/nm or higher in the in-plane direction of the magnetic recording layer while maintaining magnetic separation between magnetic crystal grains in the magnetic recording layer. Due to the features described above, it is possible to perform satisfactory heat-assisted magnetic recording with reduced noise using the magnetic recording medium of the present invention.

EMBODIMENTS OF THE INVENTION

Figure 1:
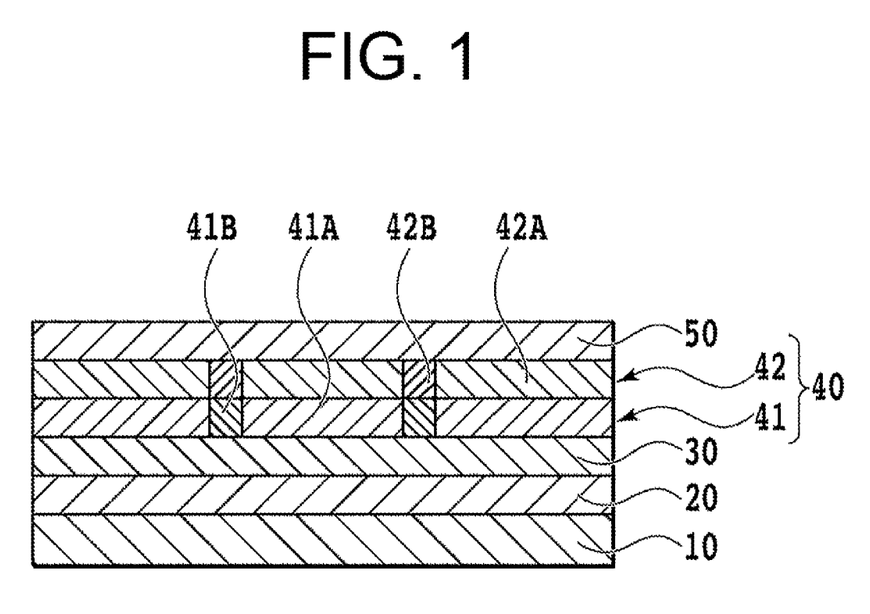
FIG. 1 is a schematic cross-sectional view of a magnetic recording medium according to the present invention.

As illustrated in FIG. 1, a magnetic recording medium according to the present invention includes a non-magnetic substrate 10 and a magnetic recording layer 40. The magnetic recording layer 40 may also be referred to as a magnetic layer for recording. FIG. 1 illustrates a configuration example of the magnetic recording medium according to the present invention, which includes a non-magnetic substrate 10, a heat sink layer 20, a seed layer 30, a magnetic recording layer 40, and a protective layer 50. The magnetic recording layer 40 has a structure in which at least two layers of a lower magnetic recording layer 41 and an upper magnetic recording layer 42 are stacked. Further, the lower magnetic recording layer 41 and the upper magnetic recording layer 42 include a magnetic crystal grain (41A, 42A) and a non-magnetic portion (41B and 42B). The magnetic crystal grain 41A may be referred to as a lower magnetic crystal grain, whereas the magnetic crystal grain 42A may be referred to as an upper magnetic crystal grain. The non-magnetic portion 41B may be referred to as a lower non-magnetic portion, whereas the non-magnetic portion 42B may be referred to as an upper non-magnetic portion.

In the configuration example of the magnetic recording medium according to the present invention illustrated in FIG. 1, the heat sink layer 20, the seed layer 30, and the protective layer 50 are layers which are provided optionally. Further, the magnetic recording medium according to the present invention may further include an adhesion layer, a soft magnetic underlayer, an intermediate layer, and the like between the non-magnetic substrate 10 and the magnetic recording layer 40.

The non-magnetic substrate 10 may be various substrates having a smooth surface. For example, the non-magnetic substrate 10 can be formed using materials (NiP-plated Al alloy, reinforced glass, crystallized glass, or the like) which are generally used in a magnetic recording medium.

The heat sink layer 20 is a layer for effectively absorbing surplus heat of the magnetic recording layer 40 generated during heat-assisted magnetic recording. The heat sink layer 20 can be formed using metal having a high thermal conductivity and high heat capacity. Moreover, from the perspective of strength or the like, the heat sink layer 20 can be formed using an Al—Si alloy, a Cu—B alloy, or the like. Further, the heat sink layer 20 may be formed using a sendust (FeSiAl) alloy, a soft magnetic CoFe alloy, or the like so that the function of the soft magnetic underlayer (the function of concentrating a perpendicular magnetic field generated from a head on the magnetic recording layer 40) can be provided to the heat sink layer 20. An optimal thickness of the heat sink layer 20 changes depending on the amount of heat and a heat distribution during heat-assisted magnetic recording and a layer structure and the thickness of respective layers of the magnetic recording medium. When the heat sink layer 20 is formed continuously with other layers, the thickness of the heat sink layer 20 is preferably between 10 nm and 100 nm from the perspective of balance with productivity. The heat sink layer 20 can be formed using an optional method known in the art such as a sputtering method (including a DC magnetron sputtering method), a vacuum deposition method, or the like. In general, the heat sink layer 20 is formed using a sputtering method.

The function of the seed layer 30 includes securing adhesion between the heat sink layer 20 and the magnetic recording layer 40, controlling the grain size and crystal orientation of the magnetic crystal grain (41A, 42A) of the magnetic recording layer 40 above the seed layer 30, and controlling a temperature rise and a temperature distribution of the magnetic recording layer 40 as a thermal barrier. In order to control the temperature rise and the temperature distribution of the magnetic recording layer 40, the seed layer 30 needs to have a function of quickly increasing the temperature of the magnetic recording layer 40 when heating the magnetic recording layer 40 during heat-assisted magnetic recording and a function of guiding heat of the magnetic recording layer 40 to the heat sink layer 20 by transferring heat in the depth direction before heat transfers in the in-plane direction of the magnetic recording layer 40. Moreover, the seed layer 30 is preferably non-magnetic.

In order to achieve the functions, the material of the seed layer 30 is appropriately selected in conformity with the material (specifically, the material of the magnetic crystal grain (41A, 42A)) of the magnetic recording layer 40. For example, when the magnetic crystal grain (41A, 42A) of the magnetic recording layer 40 is formed from an $L1_0$-type ordered alloy such as CoPt or FePt, the seed layer 30 can be formed using NiW, Ta, Cr, $SrTiO_3$, TiN, MgO, or a mixture thereof. Moreover, a plurality of layers formed of the material described above may be stacked to form the seed layer 30. From the perspective of improvement of crystallinity of the magnetic recording layer 40 (the magnetic crystal grain (41A, 42A)), control of the amount of heat (control of the temperature rise and the temperature distribution of the magnetic recording layer 40) supplied from the head during heat-assisted magnetic recording, and improvement of productivity, the seed layer 30 preferably has a thickness between 40 nm and 60 nm. The seed layer 30 can be formed using an optional method known in the art such as a sputtering method (including a DC magnetron sputtering method), a vacuum deposition method, or the like.

Figure 2:
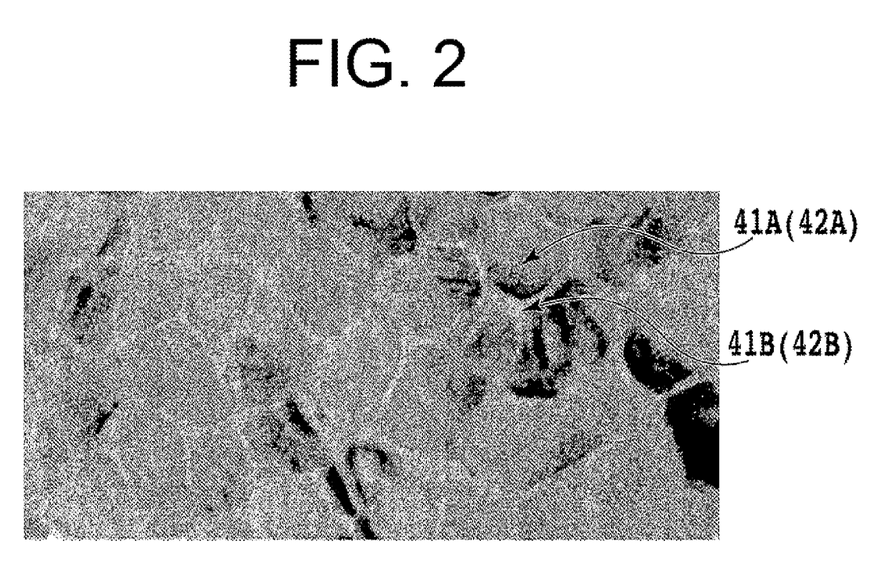
FIG. 2 illustrates a transmission electron microscope image illustrating a granular structure of a magnetic recording layer of the magnetic recording medium according to the present invention.

The magnetic recording layer 40 has a structure in which at least two layers of the lower magnetic recording layer 41 and the upper magnetic recording layer 42 are stacked. The lower magnetic recording layer 41 and the upper magnetic recording layer 42 have a upper and lower granular structures that include the magnetic crystal grain (41A, 42A) and the non-magnetic portion (41B, 42B). FIG. 2 illustrates a transmission electron microscope image of a cross-section in a planar direction (the direction parallel to the surface of the non-magnetic substrate 10), illustrating the granular structure of the magnetic recording layer 40 (the lower magnetic recording layer 41 and the upper magnetic recording layer 42). The magnetic recording layer 40 (the lower magnetic recording layer 41 and the upper magnetic recording layer 42) has a structure in which the columnar magnetic crystal grain (41A, 42A) composed mainly of a magnetic element is separated by the non-magnetic portion (41B, 42B). Here, the magnetic crystal grains (41A, 42A) each have a diameter between approximately 4 nm and 10 nm, and the non-magnetic portion (41B, 42B) has a thickness between approximately 0.1 nm and 2 nm. In order to cope with an increase in recording density, it is preferable that an arrangement interval (pitch) between magnetic crystal grains (41A, 42A) is small. On the other hand, from the perspective of preventing thermal fluctuation and facilitating reading of signals (magnetizations), it is preferable that the magnetic crystal grains (41A, 42A) are large. Thus, it is preferable that the thickness of the non-magnetic portion (41B, 42B) is as small as possible within the range where the magnetic crystal grains (41A, 42A) can be magnetically separated.

The magnetic crystal grains (41A, 42A) can be formed using a $L1_0$-based ordered alloy. The $L1_0$-based ordered alloy that can be used is an alloy such as FePt, CoPt, FePd, or CoPd that contains at least one element selected from the group consisting of Fe, Co, and Ni, and at least one element selected from the group consisting of Pt, Pd, Au, and Ir. For the purpose of decreasing the temperature necessary for ordering the ordered alloy, metal such as Cu may be added to the $L1_0$-based ordered alloy.

The magnetic recording layer 40 (the lower magnetic recording layer 41 and the upper magnetic recording layer 42) can be formed using a magnetron sputtering method or the like. Here, as illustrated in FIG. 1, it is desirable to employ a structure having the magnetic crystal grains (41A, 42A) having an integrated columnar structure in which the magnetic crystal grain 42A of the upper magnetic recording layer 42 is disposed on the magnetic crystal grain 41A of the lower magnetic recording layer 41 so as to pass through the lower magnetic recording layer 41 and the upper magnetic recording layer 42. By employing such a structure, it is possible to reduce noise during magnetic recording. This is because the magnetic crystal grains (41A, 42A) having the integrated columnar structure are separated from adjacent magnetic crystal grains by the respective non-magnetic portions (41B, 42B) of the lower magnetic recording layer 41 and the upper magnetic recording layer 42 and can perform magnetization reversal integrally.

On the other hand, in heat-assisted magnetic recording, signals (magnetizations) are written in a high-temperature region of a magnetic recording layer whereas no signals are written in a low-temperature region. That is, in heat-assisted magnetic recording, reversal of magnetization is controlled by a temperature difference of the magnetic recording layer. It is desirable that heating by a laser of a head for heat-assisted magnetic recording during recording is confined in recording bits, and after recording, the magnetic recording layer 40 is quickly cooled under a signal recording temperature. Thus, as described above, it is preferable to increase the thermal resistance in the in-plane direction of the magnetic recording layer 40 and decrease the thermal resistance in the depth direction to thereby increase the temperature gradient $dT/dx$ of the magnetic recording layer 40. In general, the magnetic crystal grains (41A, 42A) have high thermal conductivity. Thus, the above-described requirements can be satisfied by increasing the thermal resistance of the non-magnetic portion (41B, 42B).

In the magnetic recording layer 40 having the two-layer structure illustrated in FIG. 1, the lower magnetic recording layer 41 has a granular structure that accelerates magnetic separation between the magnetic crystal grains 41A, and the upper magnetic recording layer 42 has a granular structure that increases the thermal resistance in the in-plane direction. The present inventor has found that by employing such a structure, it was possible to realize the temperature gradient $dT/dx$ of 10 K/nm or higher in the in-plane direction of the magnetic recording layer 40 while maintaining magnetic separation between the magnetic crystal grains (41A, 42A). Specifically, in the lower magnetic recording layer 41 having the granular structure that accelerates magnetic separation, the non-magnetic portion 41B is formed from a material that is mainly composed of carbon.

Moreover, in the upper magnetic recording layer 42 having the granular structure that increases the thermal resistance in the in-plane direction, the non-magnetic portion 42B is formed from a material that has a lower thermal conductivity than carbon and is likely to form a granular structure. In the present invention, the non-magnetic portion 42B of the upper magnetic recording layer 42 contains a material selected from the group consisting of silicon oxide, silicon nitride, titanium oxide, and titanium nitride as its main component. Preferably, the non-magnetic portion 42B of the upper magnetic recording layer 42 is formed entirely from a material selected from the group consisting of silicon oxide, silicon nitride, titanium oxide, and titanium nitride.

When the non-magnetic portion 41B of the lower magnetic recording layer 41 was formed from a material mainly composed of silicon oxide, silicon nitride, titanium oxide, or titanium nitride, and the non-magnetic portion 42B of the upper magnetic recording layer 42 was formed from a material mainly composed of carbon, a phenomenon occurred in which a portion of the non-magnetic portion 42B of the upper magnetic recording layer 42 was not formed and the magnetic crystal grains 42A was connected to adjacent magnetic crystal grains. Due to this, the magnetic separation between the magnetic crystal grains (41A, 42A) was not sufficient, and a magnetic recording medium that produced large noise was obtained.

From the perspective of facilitating writing of signals (magnetizations) to the magnetic recording layer 40 and reading of signals (magnetizations) from the magnetic recording layer, the lower magnetic recording layer 41 and the upper magnetic recording layer 42 that form the magnetic recording layer 40 preferably have a thickness between 1 nm and 15 nm.

The protective layer 50 can be formed using a material (a material mainly composed of carbon or other materials) that is generally used in the field of magnetic recording media. Moreover, the protective layer 50 may be a single layer or may have a stacked structure. The protective layer 50 having a stacked structure may have a stacked structure of two kinds of carbon-based materials having different properties, a stacked structure of metal and a carbon-based material, or a stacked structure of a metal oxide film and a carbon-based material, for example. The protective layer 50 can be formed using an optional method known in the art such as a sputtering method (including a DC magnetron sputtering method), a vacuum deposition method, or the like.

Moreover, optionally, the magnetic recording medium of the present invention may further include a liquid lubricant layer (not illustrated) formed on the protective layer 50. The liquid lubricant layer can be formed using a material (for example, a perfluoropolyether-based lubricant or the like) that is generally used in the field of magnetic recording media. The liquid lubricant layer can be formed using a coating method such as, for example, a dip coating method, a spin coating method, or the like.

According to some embodiments, the upper magnetic recording layer 42 has a low thermal conductivity in the lateral direction (i.e., the in-plane direction). The lower magnetic recording layer 41 has a formation of a granular arrangement. The seed layer 30 functions as a thermal barrier while allowing for thermal conduction. The heat sink layer 20 has a high thermal dissipation in a lateral direction of the heat sink layer 20.

Example 1

A chemically reinforced glass substrate (N-10 glass substrate manufactured by HOYA Corporation) having a smooth surface was washed and a non-magnetic substrate 10 was prepared. The washed non-magnetic substrate 10 was introduced into a sputtering apparatus. A CuSi heat sink layer 20 having a thickness of 50 nm was formed under Ar gas pressure of 0.67 Pa according to a DC magnetron sputtering method which used a CuSi target.

Subsequently, a two-layer seed layer 30 including a Ta layer and a MgO layer was formed. Specifically, a Ta layer having a thickness of 10 nm was formed under Ar gas pressure of 0.67 Pa according to a DC magnetron sputtering method which used a Ta target. Subsequently, the stacked structure having the Ta layer formed thereon was heated to 250° C., and a MgO layer having a thickness of 5 nm was formed under Ar gas pressure of 0.06 Pa according to a RF sputtering method which used a MgO target to obtain a seed layer 30.

Subsequently, the stacked structure having the seed layer 30 formed thereon was heated to 500° C., and a lower magnetic recording layer 41 formed from $Fe_{50}Pt_{50}$—C was formed using a 80 vol % ($Fe_{50}Pt_{50}$)-20 vol % C target in which $Fe_{50}Pt_{50}$ and C were mixed. Subsequently, an upper magnetic recording layer 42 formed from $Fe_{50}Pt_{50}$—$SiO_2$ was formed using a 80 vol % ($Fe_{50}Pt_{50}$)-20 vol % $SiO_2$ target in which $Fe_{50}Pt_{50}$ and $SiO_2$ were mixed to obtain a magnetic recording layer. Here, the thicknesses of the lower magnetic recording layer 41 and the upper magnetic recording layer 42 were changed within the range of 2 nm and 8 nm.

Subsequently, a carbon protective layer 50 having a thickness of 2 nm was formed in an Ar gas atmosphere according to a DC magnetron sputtering method which used a carbon target. After the protective layer 50 was formed, the stacked structure was taken out of the sputtering apparatus.

Finally, the stacked structure was coated with perfluoropolyether using a dip coating method to form a liquid lubricant layer having a thickness of 2 nm whereby a magnetic recording medium was obtained.

Example 2

The same processes as Example 1 were repeatedly performed to obtain a magnetic recording medium except that the upper magnetic recording layer 42 formed from $Fe_{50}Pt_{50}$—$TiO_2$ was formed using a 75 vol % ($Fe_{50}Pt_{50}$)-25 vol % $TiO_2$ target in which $Fe_{50}Pt_{50}$ and $TiO_2$ were mixed. In this example, the thicknesses of the lower magnetic recording layer 41 and the upper magnetic recording layer 42 were also changed within the range of 2 nm and 8 nm.

Comparative Example 1

The same processes as Example 1 were repeatedly performed to obtain a magnetic recording medium having a magnetic recording layer having a single-layer structure except that the upper magnetic recording layer 42 (the $Fe_{50}Pt_{50}$—$SiO_2$ layer or the $Fe_{50}Pt_{50}$—$TiO_2$ layer) was not formed and the thickness of the lower magnetic recording layer 41 (the $Fe_{50}Pt_{50}$—C layer) was changed in the range of 2 nm and 12 nm.

Comparative Example 2

The same processes as Example 1 were repeatedly performed to obtain a magnetic recording medium having a magnetic recording layer having a single-layer structure except that the lower magnetic recording layer 41 (the $Fe_{50}Pt_{50}$—C layer) was not formed and the thickness of the upper magnetic recording layer 42 (the $Fe_{50}Pt_{50}$—$SiO_2$ layer) was changed in the range of 2 nm and 12 nm.

Comparative Example 3

The same processes as Example 2 were repeatedly performed to obtain a magnetic recording medium having a magnetic recording layer having a single-layer structure except that the lower magnetic recording layer 41 (the $Fe_{50}Pt_{50}$—C layer) was not formed and the thickness of the upper magnetic recording layer 42 (the $Fe_{50}Pt_{50}$—$TiO_2$ layer) was changed in the range of 2 nm and 12 nm.

(Evaluation)

The magnetic recording media were evaluated by measuring the signal-to-noise ratio (SNR) properties of read-write signals using a commercial spin stand having a heat-assisted magnetic recording head including a laser that generates light having a wavelength of 785 nm, an optical waveguide, and a scatterer for generating near-field light.

Specifically, at a position of the radius R=19 mm of the magnetic recording medium rotating at 5400 rpm, a head magnetic field current was fixed and signals were recorded at 1000 kFCI using a laser output where the largest SNR was taken, and the signal output and the noise output were measured. The SNR value (dB) was calculated from the read-out signal output and the noise output based on the following equation.

$$SNR\ (dB) = 10 \times \log[(signal\ output)/(noise\ output)]$$

The magnetic recording media were judged such that magnetic recording media having the SNR of 12 dB or higher were "Good," magnetic recording media having the SNR of 10 dB or higher and lower than 12 dB were "Allowable," and magnetic recording media having the SNR of lower than 10 dB were "Poor". The structures of the magnetic recording media, the SNR values, and the judgment results are illustrated in Table 1 (when the upper magnetic recording layer 42 was formed from $Fe_{50}Pt_{50}$—$SiO_2$) and Table 2 (when the upper magnetic recording layer 42 was formed from $Fe_{50}Pt_{50}$—$TiO_2$).

TABLE 1

Structure of Magnetic Recording Layers and Evaluation of Magnetic Recording Media (Upper Magnetic Recording Layer: $Fe_{50}Pt_{50}$—$SiO_2$)

| Examples | Thickness (nm) of Lower Magnetic Recording Layer ($Fe_{50}Pt_{50}$—C) | Thickness (nm) of Upper Magnetic Recording Layer ($Fe_{50}Pt_{50}$—$SiO_2$) | SNR (dB) | Judgment |
|---|---|---|---|---|
| Example 1 | 2 | 2 | 10.8 | Allowable |
| | 4 | 2 | 12.2 | Good |
| | 6 | 2 | 12.3 | Good |
| | 8 | 2 | 11.1 | Allowable |
| | 2 | 4 | 11.1 | Allowable |
| | 4 | 4 | 12.5 | Good |
| | 6 | 4 | 12.4 | Good |
| | 8 | 4 | 11.6 | Allowable |
| | 2 | 6 | 10.6 | Allowable |
| | 4 | 6 | 12.0 | Good |
| | 6 | 6 | 11.4 | Allowable |
| | 8 | 6 | 10.9 | Allowable |
| | 2 | 8 | 10.4 | Allowable |
| | 4 | 8 | 11.0 | Allowable |
| | 6 | 8 | 10.7 | Allowable |
| | 8 | 8 | 10.4 | Allowable |
| Comparative Example 1 | 2 | Absent | 6.2 | Poor |
| | 4 | Absent | 7.2 | Poor |
| | 6 | Absent | 8.1 | Poor |
| | 8 | Absent | 9.1 | Poor |

TABLE 1-continued

Structure of Magnetic Recording Layers and
Evaluation of Magnetic Recording Media
(Upper Magnetic Recording Layer: $Fe_{50}Pt_{50}$—$SiO_2$)

| Examples | Thickness (nm) of Lower Magnetic Recording Layer ($Fe_{50}Pt_{50}$—C) | Thickness (nm) of Upper Magnetic Recording Layer ($Fe_{50}Pt_{50}$—$SiO_2$) | SNR (dB) | Judgment |
|---|---|---|---|---|
| | 10 | Absent | 5.1 | Poor |
| | 12 | Absent | 2.5 | Poor |
| Comparative Example 2 | Absent | 2 | 4.0 | Poor |
| | Absent | 4 | 6.6 | Poor |
| | Absent | 6 | 7.6 | Poor |
| | Absent | 8 | 7.2 | Poor |
| | Absent | 10 | 4.5 | Poor |
| | Absent | 12 | 2.2 | Poor |

TABLE 2

Structure of Magnetic Recording Layers and
Evaluation of Magnetic Recording Media
(Upper Magnetic Recording Layer: $Fe_{50}Pt_{50}$—$TiO_2$)

| Examples | Thickness (nm) of Lower Magnetic Recording Layer ($Fe_{50}Pt_{50}$—C) | Thickness (nm) of Upper Magnetic Recording Layer ($Fe_{50}Pt_{50}$—$TiO_2$) | SNR (dB) | Judgment |
|---|---|---|---|---|
| Example 2 | 2 | 2 | 10.5 | Allowable |
| | 4 | 2 | 12.0 | Good |
| | 6 | 2 | 12.1 | Good |
| | 8 | 2 | 11.0 | Allowable |
| | 2 | 4 | 11.1 | Allowable |
| | 4 | 4 | 12.4 | Good |
| | 6 | 4 | 12.2 | Good |
| | 8 | 4 | 11.4 | Allowable |
| | 2 | 6 | 10.7 | Allowable |
| | 4 | 6 | 12.2 | Good |
| | 6 | 6 | 12.4 | Good |
| | 8 | 6 | 11.9 | Allowable |
| | 2 | 8 | 11.4 | Allowable |
| | 4 | 8 | 12.2 | Good |
| | 6 | 8 | 11.6 | Allowable |
| | 8 | 8 | 10.8 | Allowable |
| Comparative Example 1 | 2 | Absent | 6.2 | Poor |
| | 4 | Absent | 7.2 | Poor |
| | 6 | Absent | 8.1 | Poor |
| | 8 | Absent | 9.1 | Poor |
| | 10 | Absent | 5.1 | Poor |
| | 12 | Absent | 2.5 | Poor |
| Comparative Example 3 | Absent | 2 | 3.2 | Poor |
| | Absent | 4 | 5.7 | Poor |
| | Absent | 6 | 6.2 | Poor |
| | Absent | 8 | 6.0 | Poor |
| | Absent | 10 | 5.2 | Poor |
| | Absent | 12 | 2.1 | Poor |

As is obvious from Table 1 and Table 2, the magnetic recording medium of Example 1 including the magnetic recording layer 40 obtained by stacking the $Fe_{50}Pt_{50}$—C lower magnetic recording layer 41 and the $Fe_{50}Pt_{50}$—$SiO_2$ upper magnetic recording layer 42 and the magnetic recording medium of Example 2 including the magnetic recording layer 40 obtained by stacking the $Fe_{50}Pt_{50}$—C lower magnetic recording layer 41 and the $Fe_{50}Pt_{50}$—$TiO_2$ upper magnetic recording layer 42 provided the SNR of 10 dB or higher and were judged to be "Good" or "Allowable". In contrast, the magnetic recording medium of Comparative Example 1 including the magnetic recording layer having the single $Fe_{50}Pt_{50}$—C lower magnetic recording layer 41, the magnetic recording medium of Comparative Example 2 including the magnetic recording layer having the single $Fe_{50}Pt_{50}$—$SiO_2$ upper magnetic recording layer 42, and the magnetic recording medium of Comparative Example 3 including the magnetic recording layer having the single $Fe_{50}Pt_{50}$—$TiO_2$ upper magnetic recording layer 42 provided the SNR of lower than 10 dB and were judged to be "Poor".

The invention claimed is:

1. A magnetic recording medium for heat-assisted magnetic recording, comprising:
   a non-magnetic substrate;
   a heat sink layer selected from the group consisting of CuB, a CuB alloy, and CuSi;
   a seed layer; and
   a magnetic layer for recording and including
      a lower magnetic recording layer having
         a lower granular structure including lower magnetic crystal grains, and
         a lower non-magnetic portion, that surrounds the lower magnetic crystal grains, mainly composed of carbon, and
      an upper magnetic recording layer having
         an upper granular structure including upper magnetic crystal grains, and
         an upper non-magnetic portion, that surrounds the upper magnetic crystal grains, formed from a material selected from the group consisting of silicon nitride, and titanium nitride,
   wherein the non-magnetic substrate, the heat sink layer, the seed layer, and the magnetic layer are disposed in that stated order along a straight line.

2. The magnetic recording medium for heat-assisted magnetic recording according to claim 1, wherein the lower magnetic crystal grains and the upper magnetic crystal grains are each formed from an ordered alloy.

3. The magnetic recording medium for heat-assisted magnetic recording according to claim 2, wherein each of the ordered alloys contains both of
   at least one element selected from the group consisting of Fe, Co and Ni, and
   at least one element selected from the group consisting of Pt, Pd, Au and Ir.

4. The magnetic recording medium for heat-assisted magnetic recording according to claim 2, wherein each of the ordered alloys is selected from the group consisting of FePt, CoPt, FePd and CoPd.

5. The magnetic recording medium for heat-assisted magnetic recording according to claim 1, wherein the heat sink layer absorbs surplus heat of the magnetic layer generated during heat-assisted magnetic recording of the magnetic layer.

6. The magnetic recording medium for heat-assisted magnetic recording according to claim 1, further comprising a protective layer provided on the magnetic layer so that the non-magnetic substrate, the heat sink layer, the seed layer, the lower magnetic recording layer, the upper magnetic recording layer and the protective layer are disposed in that stated order on the straight line.

7. The magnetic recording medium for heat-assisted magnetic recording according to claim 1, wherein the seed layer increases a temperature of the upper and lower magnetic recording layers when heating the upper and lower magnetic recording layers during heat-assisted magnetic recording, and guides heat of the magnetic layer to the heat sink layer.

8. The magnetic recording medium for heat-assisted magnetic recording according to claim 1, wherein the seed layer controls a crystal orientation of the upper and lower magnetic crystal grains, and is a thermal barrier that controls a temperature rise and temperature distribution of the upper and lower magnetic recording layers.

9. The magnetic recording medium for heat-assisted magnetic recording according to claim 1, wherein the seed layer is non-magnetic.

10. The magnetic recording medium for heat-assisted magnetic recording according to claim 1, further comprising a protective layer provided on the magnetic layer.

11. The magnetic recording medium for heat-assisted magnetic recording according to claim 1, wherein the upper and lower magnetic recording layers are in direct contact with each other.

12. The magnetic recording medium for heat-assisted magnetic recording according to claim 1, wherein the lower non-magnetic portion is in direct contact with the upper non-magnetic portion.

13. The magnetic recording medium for heat-assisted magnetic recording according to claim 1, wherein the upper granular structure is in direct contact with the lower granular structure.

14. The magnetic recording medium for heat-assisted magnetic recording according to claim 1, wherein the upper granular structure, the lower granular structure, the upper non-magnetic portion and the lower non-magnetic portion are in direct contact with each other.

15. The magnetic recording medium for heat-assisted magnetic recording according to claim 1, wherein a temperature gradient dT/dx of the magnetic layer in an in-plane direction of the magnetic layer is at least 10 K/nm while maintaining magnetic separation between the upper and lower magnetic crystal grains with the upper and lower non-magnetic portions.

16. The magnetic recording medium for heat-assisted magnetic recording according to claim 1, wherein the material of the heat sink layer is the CuB alloy.

17. The magnetic recording medium for heat-assisted magnetic recording according to claim 1, wherein the material of the heat sink layer is the CuSi.

18. A magnetic recording medium for heat-assisted magnetic recording, comprising:
a non-magnetic substrate;
a heat sink layer selected from the group consisting of CuB, a CuB alloy, and CuSi;
a magnetic layer for recording and including
a lower magnetic recording layer having
a lower granular structure including lower magnetic crystal grains, and
a lower non-magnetic portion, that surrounds the lower magnetic crystal grains, mainly composed of carbon, and
an upper magnetic recording layer having
an upper granular structure including upper magnetic crystal grains, and
an upper non-magnetic portion, that surrounds the upper magnetic crystal grains, formed from a material different from that of the lower non-magnetic portion.

19. The magnetic recording medium for heat-assisted magnetic recording according to claim 18,
wherein the material of the upper non-magnetic portion has a lower thermal conductivity than carbon so that a temperature gradient dT/dx of the magnetic layer in an in-plane direction of the magnetic layer is at least 10 K/nm while maintaining magnetic separation between the upper and lower magnetic crystal grains with the upper and lower non-magnetic portions,
wherein the lower non-magnetic portion is in direct contact with the upper non-magnetic portion, and
wherein the lower non-magnetic portion and the upper non-magnetic portion form a non-magnetic part extending for an entire dimension of the magnetic layer, the non-magnetic part being composed only of the upper and lower non-magnetic portions.

20. A magnetic recording medium for heat-assisted magnetic recording, comprising:
a non-magnetic substrate;
a heat sink layer selected from the group consisting of CuB, a CuB alloy, and CuSi; and
a magnetic layer for recording and including
a lower magnetic recording layer having
a lower granular structure including lower magnetic crystal grains, and
a lower non-magnetic portion, that surrounds the lower magnetic crystal grains, mainly composed of carbon, and
an upper magnetic recording layer having
an upper granular structure including upper magnetic crystal grains, and
an upper non-magnetic portion, that surrounds the upper magnetic crystal grains, formed from a material selected from the group consisting of silicon nitride, and titanium nitride,
wherein the lower non-magnetic portion is in direct contact with the upper non-magnetic portion,
wherein the lower non-magnetic portion and the upper non-magnetic portion form a non-magnetic part extending for an entire dimension of the magnetic layer, the non-magnetic part being composed only of the upper and lower non-magnetic portions.

* * * * *